(12) United States Patent
Marman

(10) Patent No.: US 10,706,698 B2
(45) Date of Patent: Jul. 7, 2020

(54) ENERGY SAVINGS AND IMPROVED SECURITY THROUGH INTELLIGENT LIGHTING SYSTEMS

(71) Applicant: AVIGILON ANALYTICS CORPORATION, Vancouver (CA)

(72) Inventor: Douglas H. Marman, Ridgefield, WA (US)

(73) Assignee: AVIGILON ANALYTICS CORPORATION, Vancouver (CA)

( * ) Notice: Subject to any disclaimer, the term of this patent is extended or adjusted under 35 U.S.C. 154(b) by 882 days.

(21) Appl. No.: 14/940,098

(22) Filed: Nov. 12, 2015

(65) Prior Publication Data

US 2016/0073477 A1    Mar. 10, 2016

Related U.S. Application Data

(63) Continuation of application No. 12/104,281, filed on Apr. 16, 2008, now Pat. No. 9,215,781.

(51) Int. Cl.

| | |
|---|---|
| G06F 15/173 | (2006.01) |
| G08B 13/196 | (2006.01) |
| H04L 12/26 | (2006.01) |
| G06F 15/16 | (2006.01) |
| H04L 29/06 | (2006.01) |

(52) U.S. Cl.
CPC ........ *G08B 13/19613* (2013.01); *H04L 43/00* (2013.01); *H04L 63/00* (2013.01); *Y02B 20/48* (2013.01)

(58) Field of Classification Search
CPC ................. H04L 43/00; H04L 63/00
USPC .......................................... 709/224
See application file for complete search history.

(56) References Cited

U.S. PATENT DOCUMENTS

| | | | |
|---|---|---|---|
| 5,986,357 | A | 11/1999 | Myron et al. |
| 6,114,816 | A | 9/2000 | Nickolls et al. |
| 6,151,529 | A | 11/2000 | Batko |
| 6,442,474 | B1 | 8/2002 | Trajkovic et al. |
| 6,909,921 | B1 | 6/2005 | Bilger |
| 7,045,968 | B1 | 5/2006 | Bierman et al. |
| 7,490,957 | B2 | 2/2009 | Leong et al. |
| 7,627,171 | B2 | 12/2009 | Saptharishi et al. |

(Continued)

OTHER PUBLICATIONS

Mesenbrink; "Campus Communications"; Security Magazine; Sep. 2001; p. 54-55.

(Continued)

*Primary Examiner* — Karen C Tang
(74) *Attorney, Agent, or Firm* — BakerHostetler

(57) ABSTRACT

An intelligent lighting system employs energy efficient outdoor lighting and intelligent sensor technology in cooperation with video analytics processing. The lighting system selectively illuminates outdoor spaces and identifies and evaluates events in a scene monitored by a video camera, thereby to facilitate proactive and appropriate security responses to those events. Selective use of advanced lighting fixtures may significantly reduce costs of lighting areas that are monitored by security systems such as streets, public parks, and parking lots, while simultaneously improving security, safety, and traffic control. Energy savings alone, for a properly designed system, are estimated at 50%-90% of current usage. When combined with remote monitoring, such systems may prevent accidents and criminal activity.

15 Claims, 5 Drawing Sheets

(56) References Cited

U.S. PATENT DOCUMENTS

| | | |
|---|---|---|
| 2005/0270175 A1 | 12/2005 | Peddie et al. |
| 2008/0048886 A1 | 2/2008 | Brown et al. |
| 2009/0022362 A1* | 1/2009 | Gagvani .......... G08B 13/19615 382/100 |
| 2009/0115597 A1 | 5/2009 | Giacalone |
| 2009/0171478 A1 | 7/2009 | Wong |

OTHER PUBLICATIONS

Mesenbrink; "Parking Protection"; Security Magazine; Sep. 2001; p. 28-29.

Visentry; "VirtualSentry Real Time Event-Based Remote Video Monitoring Solution"; Feb. 7, 2007; accessed Aug. 13, 2011; http://web.archive.org/web/20070207230911/http:www.visentry.com/visentrypdf/VirtualSentry.pdf; 5 pages.

* cited by examiner

ENERGY SAVINGS AND IMPROVED SECURITY THROUGH INTELLIGENT LIGHTING SYSTEMS

CROSS REFERENCE TO RELATED APPLICATIONS

This application is a continuation of U.S. patent application Ser. No. 12/104,281, filed Apr. 16, 2008, the contents of which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The system disclosed relates to video analytics technology, outdoor lighting systems, sensors, and security for public and commercial venues. Video analytics technology entails the use of computer vision, artificial intelligence techniques, and video processing algorithms to filter video data for the purpose of detecting behavior or events that warrant alerting security personnel.

BACKGROUND INFORMATION

In the United States, between 10 and 100 billion kilowatt-hours of electric power are used every year to light roads, highways, and parking lots at night. Airline passengers descending into a city on a clear night can easily see the extent to which electricity is being used to light streets and roads throughout the night for the purpose of safety and security. Much of the time, this energy is being expended unnecessarily when thoroughfares are untraveled and parking lots are vacant. Not only is the United States wasting a tremendous amount of electrical energy by perpetually illuminating empty streets and parking lots, but extraneous lights also cause "light noise," a form of light pollution that has become so extreme that few city dwellers ever see stars, even on a cloudless night. Furthermore, by-products created by this wasted energy may continue to have a lasting and destructive impact on the environment.

Despite the wasted energy, parking lot security remains insufficient, and nighttime crime continues to pose a serious problem at colleges, in commercial areas, and in public spaces. More than 60% of crime on university campuses is reported to take place in parking lots. Parking lots are often considered the most dangerous locations for business commuters and apartment dwellers ("Campus Communications" and "Parking Protection," by john Mesenbrink, Security Magazine, September 2001). Malls and shopping centers also lack nighttime parking lot security, and the most dangerous incidents occurring in public parks take place at night.

Lights and cameras are typical devices deployed to improve security. Until the present time, society has paid for security with a high electric bill resulting from keeping fixtures illuminated continuously. A second security precaution, video surveillance cameras, is added to act as a deterrent, but most cameras record for later review only events that have already occurred. Fewer than 5% of surveillance cameras are monitored; therefore, they do not proactively prevent crime.

Indoor incandescent lights currently use occupancy sensors or motion detectors to automatically activate switching and thereby save energy. Unfortunately, these systems are ineffective in large, open outdoor areas. They work well indoors because incandescent lamps used to light interior spaces are capable of switching on and off quickly. Some fast-start fluorescent lights also switch sufficiently fast for indoor applications. However, gymnasium lighting or lights used in large, open retail stores over long periods of time generally use gas vapor lighting to save energy. Unfortunately, gas vapor bulbs cannot be switched on or off quickly, and they are difficult to dim effectively. Because they are too slow to switch on and off in response to real-time activity, these existing fixtures are incompatible with motion or occupancy sensors.

Most outdoor lighting for streets and parking lots also uses sodium vapor or other gas vapor bulbs. These light sources are chosen for maximum efficiency because they require the least amount of energy. Typical sodium vapor lamps used in street lights have efficiencies of about 100-150 lumens per Watt. Low pressure sodium vapor lamps may reach even higher efficiencies, up to 200 lumens per Watt, but they are seldom used because of the strong yellow cast characterizing their light output, rather than the preferred white light. For this reason, some large area lighting applications, especially in locations like retail stores, have switched to metal halide lamps, because of their truer white light output. However, metal halide efficiencies are not so high, only about 80-125 lumens per Watt, and they have shorter lifetimes, which are the reasons why metal halide lamps are not used so often for street lights. Moreover, the above-mentioned efficiencies of metal halide lamps and sodium vapor lamps are primarily achieved after the lamps are heated. When gas vapor lamps are cold, efficiencies and light output are much lower, and ballasts required for these gas vapor lamps reduce efficiencies even further.

Motion sensors controlling indoor incandescent or special fluorescent lights typically employ either infrared or ultrasonic technology. The most common indoor motion sensor is a low cost far-infrared detector, which is ideal for detecting human beings traversing a room. Infrared detectors are also used in incandescent "security lights" near entryways or exits; however, when used outdoors, infrared detectors commonly exhibit false triggering, as many security companies have discovered. Furthermore, the detection range of infrared detectors is limited, and the detectors lose sensitivity as outdoor temperatures increase. Other indoor occupancy sensors rely on ultrasonic detectors. An ultrasonic detector transmits into a closed room sound waves at frequencies beyond the range of human hearing. The detector then detects a shift in frequency by sensing reflected waves and comparing the transmitted and reflected frequencies. An object in the path of the sound wave moving in a direction toward or away from the sensor compresses the wave, thereby perturbing the frequency and introducing a "Doppler" shift. While they are very sensitive to small changes within a closed room, like infrared motion sensors, ultrasonic sensors do not recognize a target if it stops moving. Being highly sensitive, ultrasonic sensors are subject to false triggering by outdoor wind and air turbulence. Furthermore, because they depend on reflections, ultrasonic sensors are unsuitable for use in wide open or partly enclosed spaces, effectively restricting them to indoor environments.

Intelligent sensors for use outdoors in traffic control applications are generally unable to recognize moving vehicles or pedestrians along a long stretch of road. The intelligent sensors cannot distinguish human or vehicular motion from that of animals, newspapers blowing in the wind, parked cars, or a variety of other distractions. Even the most sophisticated outdoor motion sensors, which are much more expensive than the indoor variety, may not distinguish between animals and human beings. Intelligent sensors may not detect moving vehicles sufficiently far away to turn on street lights soon enough, unless the vehicles are moving very slowly. When cars are cold, for instance, upon ignition, infrared sensors have difficulty detecting cars located far away, because the sensors respond primarily to spatial temperature changes.

10 U.S. Pat. Nos. 7,045,968 and 6,909,921 describe indoor incandescent lighting control systems, including the use of motion sensors, in the latter case. U.S. Pat. No. 6,151,529 describes an intelligent lighting control system for indoor lights based upon analysis of data from simple motion sensors. U.S. Pat. No. 6,114,816 describes a lighting system that controls gas discharge lamps, dimming them automatically according to slow changes sensed in the immediate environment such as time of day and ambient light level. Occupancy levels are mentioned, but primarily in reference to slowly changing occupancy. U.S. Pat. No. 5,986,357 features an occupancy sensor utilizing ultrasonic and infrared sensors, combined for use in indoor lighting control. U.S. Patent Application Pub. No. 2005/0281030 for "Lighting Control Using LED Lighting with Fluorescent Lighting Fixtures" focuses on indoor applications and does not mention image or video sensors. What is needed, therefore, is a system for and method of preventing energy waste by intelligently controlling activation and brightness of outdoor lighting so that lights remain on only when they are useful, while simultaneously improving security in parking lots and outdoor public spaces.

SUMMARY OF THE DISCLOSURE

An intelligent lighting system employs energy-efficient outdoor lighting and intelligent sensor technology in cooperation with video analytics processing to selectively illuminate outdoor spaces and to identify and evaluate events in a scene monitored by a video camera. The system thus facilitates proactive and appropriate security responses to the monitored events, while saving energy by switching off lights when they are not needed (e.g., when no people or vehicles are present). Intelligent lighting components of the system may significantly reduce costs of lighting-monitored areas such as streets, public parks, and parking lots, while simultaneously improving security, safety, and traffic control. Energy savings afforded by a properly designed system are estimated at 50%-90% of current usage, with a commensurate twofold to tenfold increase in the lifetime of light sources, thereby saving maintenance and replacement costs as well. Applications envisioned in this disclosure focus on public thoroughfares or other roads and expansive areas such as an interior of a large enclosure (e.g., aircraft assembly facility), an outdoor open space (e.g., a parking lot), and an outdoor facility (e.g., a marina). Other large spaces expected to benefit from an intelligent lighting control system include, for example, vehicle transfer terminals, automobile dealerships, commercial warehouses, hospitals, public works facilities, public parks, and corporate manufacturing facilities.

Adding communication capability to an intelligent lighting system enables transmission of a warning of approaching subjects to one or several lights farther down a street, allowing the lights to be more responsive. This communication may be wireless, or connections may use existing power transmission infrastructure. For example, if a vehicle travels down a road at 50 miles per hour and is seen by a camera installed in an intelligent street lamp, the lamp relays to the next street lamp down the road a message indicating the presence of traffic, prior to the arrival of the vehicle. This is useful on curved roads or in general to improve reliability of detecting approaching traffic. In a parking lot, when a subject is seen entering the lot, a sensor may switch on a nearby light while also alerting neighboring lights, so that the whole area remains lit as long as the subject is present.

An intelligent lighting control system may simultaneously enhance safety and security in the areas where it is deployed. For example, intelligent image sensors used to detect pertinent activity may also recognize traffic problems, roadway accidents, or vehicles traveling in the wrong direction. In parking lots, these sensors may recognize people loitering around cars, thieves attempting to break into vehicles, suspicious individuals approaching people emerging from a nearby building, or other potentially dangerous scenes. When combined with remote monitoring, such systems may prevent accidents and criminal activity, while enabling remote traffic control.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
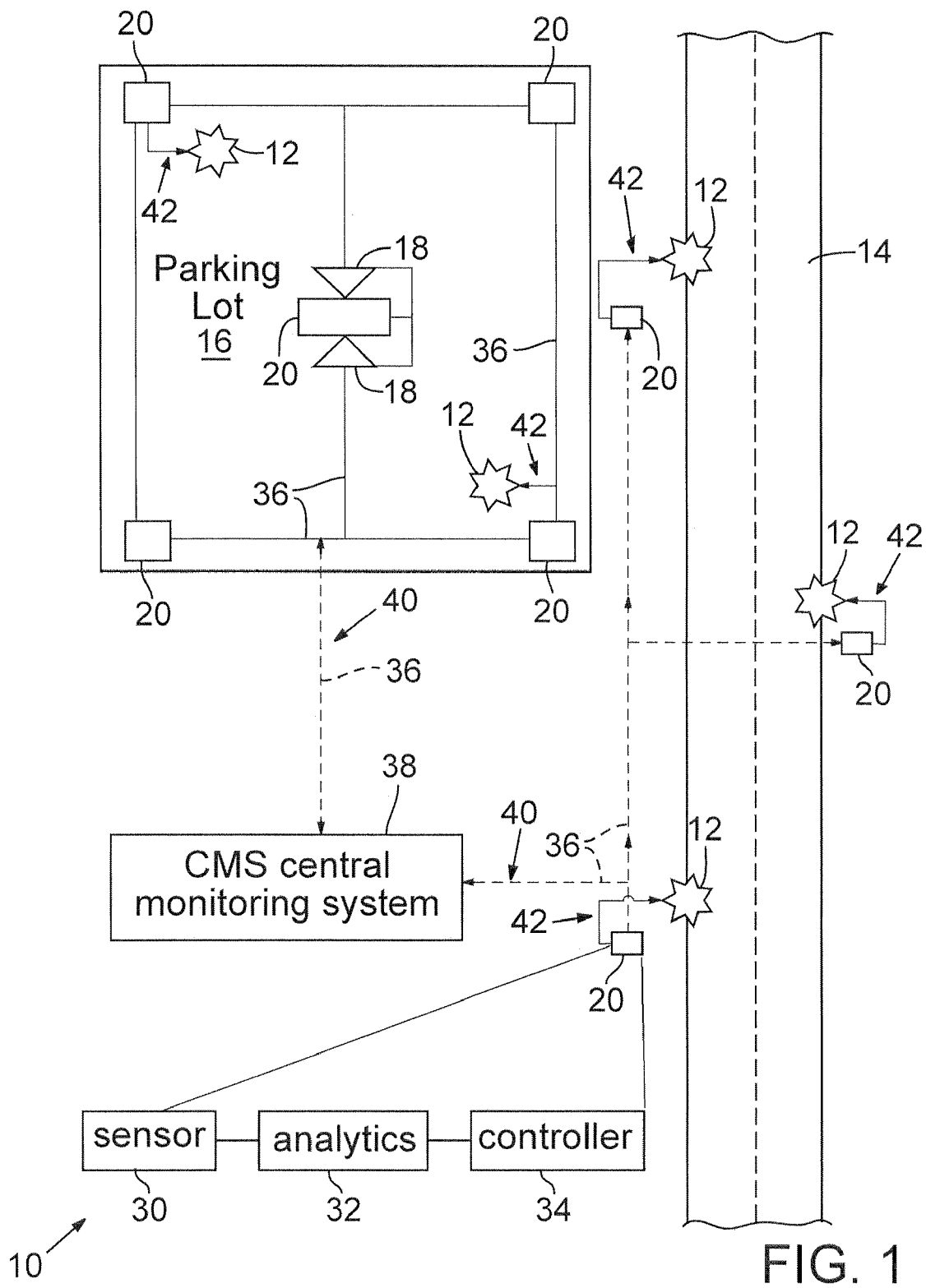
FIG. 1 is a block diagram of a representative overall intelligent lighting system installed in a parking lot and along adjacent roadways.

FIG. 1 is an overall system block diagram of a preferred representative intelligent lighting system 10. With reference to FIG. 1, major elements of lighting system 10 include energy-efficient outdoor LED light fixtures 12 illuminating a road 14 and a parking lot 16, optional audio speakers 18, and multiple video cameras 20. Each video camera 20 (as indicated by an exploded representation of one of them at the bottom of FIG. 1), is equipped with image sensors 30 for multi-directional detection of vehicles and for nighttime detection of human beings; programmable video analytics 32 capable of accurate motion detection, license plate recognition, and distance and velocity determination; and a programmable controller 34 managing audio speakers 18, image capture in cooperation with image sensors 30, and associated network communications enabled by a network 36. Programmable controller 36 may, in the alternative, control the states of illumination of more than one of light fixtures 12. Programmable controller 34 may include self-diagnostic capability to detect failure of system components in response to information collected by one or more image sensors 30, video streaming through network 36 to a remote central monitoring station 38 that coordinates lighting system 10 and accommodates human intervention by security personnel, centrally initiated feedback control of audio speakers 18 and light fixtures 12, and automatic local feedback control 40 of light fixtures 12. Central monitoring station 38 in the embodiments described is part of a security or vehicle traffic control terminal.

Although systems envisioned for streets and parking lots are nearly identical, their needs and requirements differ. Street lighting is provided primarily for safety, while parking lot lighting exists primarily for improving security. Both may benefit from the system described, but each application makes use of lighting system 10 in different ways. For instance, it may be desirable for street lighting to respond to moving vehicles, but not necessarily to pedestrians. In urban or commercial locations, it may be beneficial to illuminate streets for pedestrians, but in more rural areas, it may be adequate to illuminate a length of road or highway only when vehicles are passing through it. In a parking lot application, illumination of stationary vehicles may cease after a period of time has elapsed, while lights turn on and remain illuminated in response to the presence of pedestrians.

Light Sources

State-of-the-art bright white LED lights suitable for use in LED light fixtures 12 achieve efficiencies of approximately 130 lumens per Watt, which is comparable to efficiencies achieved by conventional high-pressure sodium vapor lamps, most commonly used for street and parking lot lighting. The most significant energy savings, so far untapped, can be achieved by taking advantage of the superior switching response time of LEDs. Sodium vapor, mercury vapor, and metal halide lights are notorious for their slow switching speeds. It takes approximately 5-10 minutes for such conventional light fixtures to reach optimum light output, thereby precluding their use in an intelligent outdoor lighting control application. A high efficiency LED lamp, on the other hand, switches from a nonilluminated state to a fully illuminated state in less than a millisecond.

While the efficiency of LED lights is expected to continue to increase, there are more compelling reasons for using LED lights. These include a longer life expectancy (50,000 hours versus 20,000 hours for sodium vapor and 10,000 hours-15,000 hours for metal halide), better cold weather performance, reduced environmental impact (LED lighting products are mercury-free), less-hazardous materials used in manufacturing compared with levels of them used to manufacture high-pressure sodium vapor and metal halide lamps, and the inherent directionality of LED light, which facilitates aiming light where it is needed. In residential locations where sudden switching and flickering lights may cause a disturbance, gradual dimming is preferred. This is another advantage of LED lighting over most gas vapor lamps, which are difficult to dim.

Figure 2:
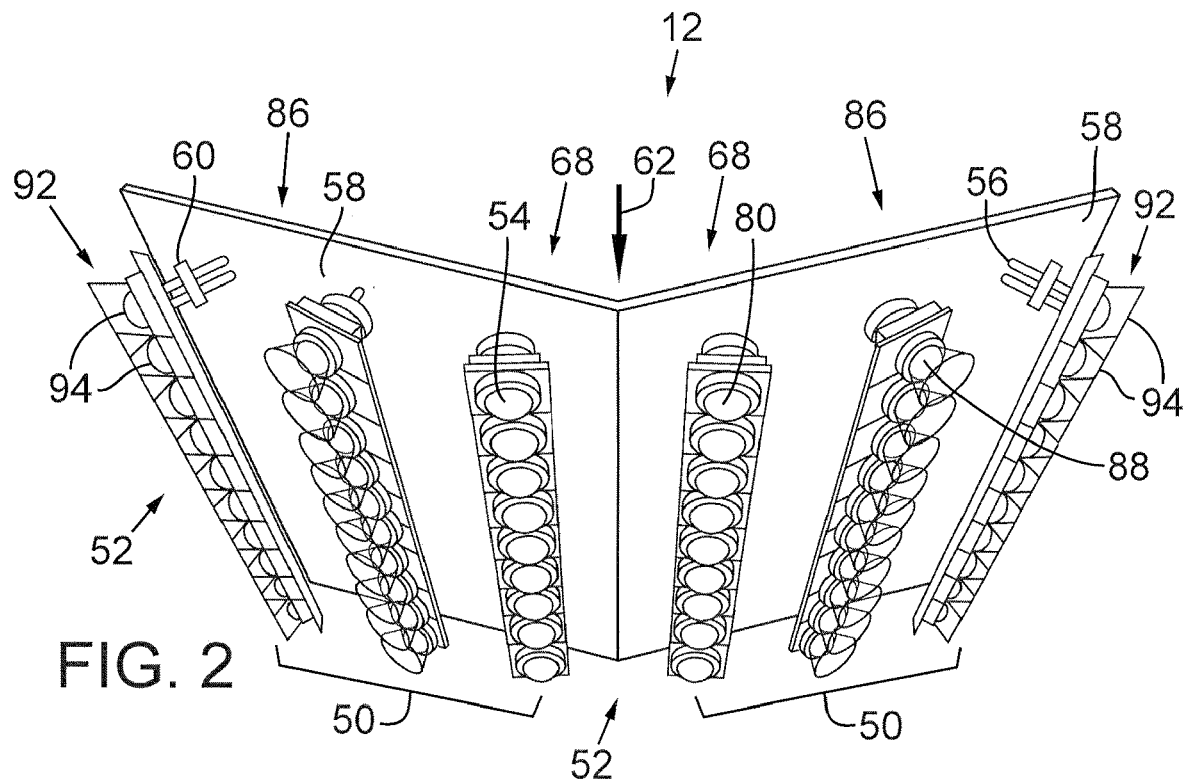
FIG. 2 is a pictorial perspective view of a preferred embodiment of an LED light fixture for an outdoor high-intensity light application such as street lighting.

LED light fixtures 12 suitable for large-scale use outdoors can be obtained from CREE Outdoor Lighting, Inc. of Durham, N.C. Each light fixture 12 shown in FIG. 2 is in the form of a chevron and includes two groups 50 of three rows 52 of white LED lamps 54, with ten individual lamps 54 in each row 52. Each lamp 54 is attached by a connector 56 to, and wired through, a rectangular supporting backplane 58, the surface of which is coated with a thermal barrier 60. Rectangular supporting backplane 58 is angled at approximately 130 degrees along a midline axis 62 to form two backplane half-sections that provide light fixture 12 with its chevron profile and thereby allow wider illumination of the surface of road 14.

Figure 3:
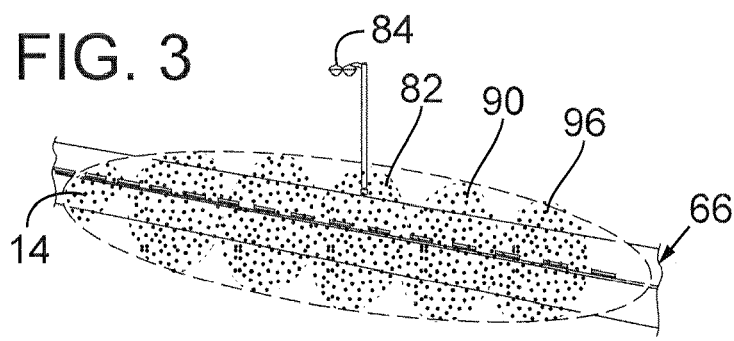
FIG. 3 depicts the light pattern produced on a road by the LED light fixture shown in FIG. 2, when used in a street lamp configuration.

Three rows 52 of LED lamps 54 attached to either half-section of backplane 58 are each different by design. FIG. 3 shows a directional LED street lamp and a resulting composite illumination pattern 66 extending along the length of road 14. An inner row 68 closest to midline axis 62 comprises bare LED lamps 80 with a hemispherical profile to illuminate a near field area 82 of pattern 66 directly underneath a mounted light source 84. A middle row 86 comprises oval profile LED lamps 88 designed to illuminate at mid-range area 90 of pattern 66; and an outer row 92 comprises collimating optic LED lamps 94 designed to illuminate at a farthest distance 96 of pattern 66 from mounted light source 84.

Figure 4:
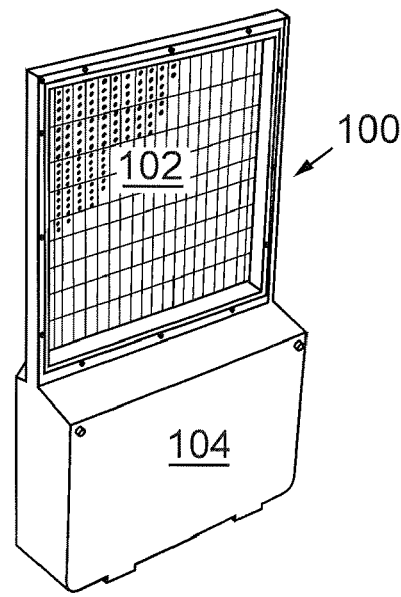
FIG. 4 is a pictorial perspective view of a preferred LED light fixture designed specifically for lighting parking lots or other large public spaces.
Figure 5:
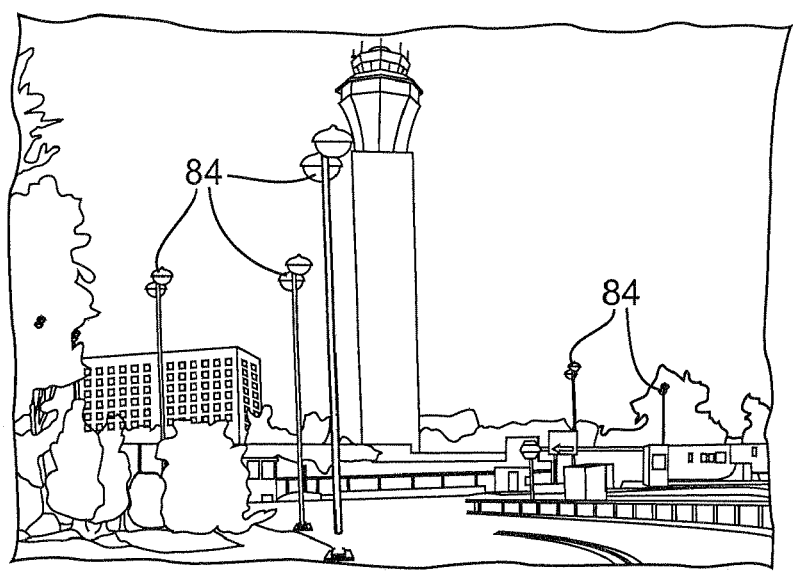
FIG. 5 is a photograph of airport roadways and parking lots, illuminated by lightposts configured with white LED fixtures of the type shown in FIG. 4.

FIG. 4 shows an alternative fixture configuration 100, comprising a dense square grid 102 of LED lamps attached at one end to a supporting brick 104. Fixture configurations 100 are preferably mounted in pairs on light posts for illuminating expansive areas such as parking lot 16, a city park, or a large intersection such as the airport intersection shown in FIG. 5.

Sensor Technology

Intelligent lighting system 10 includes, mounted at periodic intervals along road 14 and within parking lot 16, video surveillance cameras 20 equipped with image sensors 30 as component parts, for the purpose of detecting vehicles and pedestrians. Video surveillance cameras 20 are ideally mounted on the same poles as those supporting the light fixtures and share the same source of power. in a preferred embodiment, a traditional street lamp is replaced with a device contained in a single package that includes an LED light and a camera equipped with video analytics. The camera and analytics components may not necessarily be included on every light pole, but perhaps, for example, on every third one. Detection of vehicles on roads and pedestrians in and around parking lots pose different challenges and require different types of image sensor technology. For instance, traditional cameras employed as image sensors do not function well without external lighting and are, therefore, not suitable for monitoring parking lots at night. Because moving vehicles including motorcycles and bicycles are required by law to use active headlights at night, they are easily recognized, even at long distances. Whereas individuals, while they may be visible to motorists if they are wearing reflective clothing, seldom carry an active, detectable light source. Thus, a different solution is needed to sense the presence of pedestrians at night.

For the street application, intelligent lighting system 10 uses image sensors 30 of various types that are capable of recognizing a moving vehicle at a distance sufficiently far away to turn on lights well before the vehicle arrives at the location of the street lamp associated with a particular image sensor 30. A preferred embodiment specifies ultra wide dynamic range CMOS (complementary metal oxide semiconductor) image sensors because they tolerate bright light such as direct sunlight, headlights, or reflections without causing the sensor to "bloom" or overexpose the rest of the picture. In particular, mega-pixel CMOS dual video sensors are preferred as street lighting detectors because they offer higher resolution for longer-range detection in addition to low-light sensitivity and ultra wide dynamic range. Enhanced low light sensitivity, also characteristic of high performance CMOS sensors, may be achieved by selecting sensors with low internal noise, large pixels for gathering more light energy, low f-stop optics and, in some cases, with video post processing to improve the signal-to-noise ratio by canceling out internal noise. CMOS image sensors have the additional advantage of low cost.

To address the parking lot issue, another type of image sensor 30 that is capable of detecting pedestrians at night can be located near building exits or at parking lot entrances, where a few lights may be continuously illuminated. Then the rest of the lot may be illuminated when needed in response to detection of pedestrians in these outer zones. In cases where light pollution is detrimental, for instance, if neighbors prefer not to have lights flickering on and off during the night, near-infrared light sources may be used, which are invisible to the human eye but are easily detected by CMOS or CCD (charge-coupled device) image sensors. Infrared "lights" may be used primarily near the entrances to the lot, or they may be positioned to cover the entire lot. However, full coverage, while providing better security, wastes energy just as continuous visible light does. Therefore, this approach is not ideal.

One solution is the use of infrared image sensors 30 in cooperation with video analytics 32. The infrared image sensors control the states of illumination of light sources by maintaining them in a nonilluminated state and activating one or more of them to an illuminated state in absence of and in response to, respectively, an occurrence of a behavior or an event detected by performance of video analytics processing.

Figure 6:
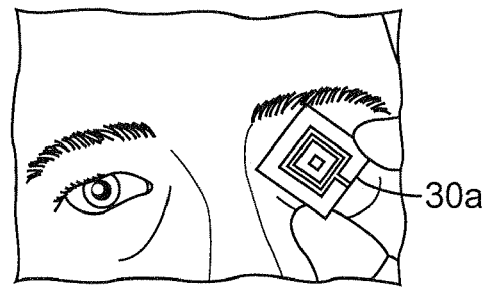
FIG. 6 is a photograph of a visible/infrared sensor integrated circuit chip held over a person's eye to indicate scale size.
Figure 7:
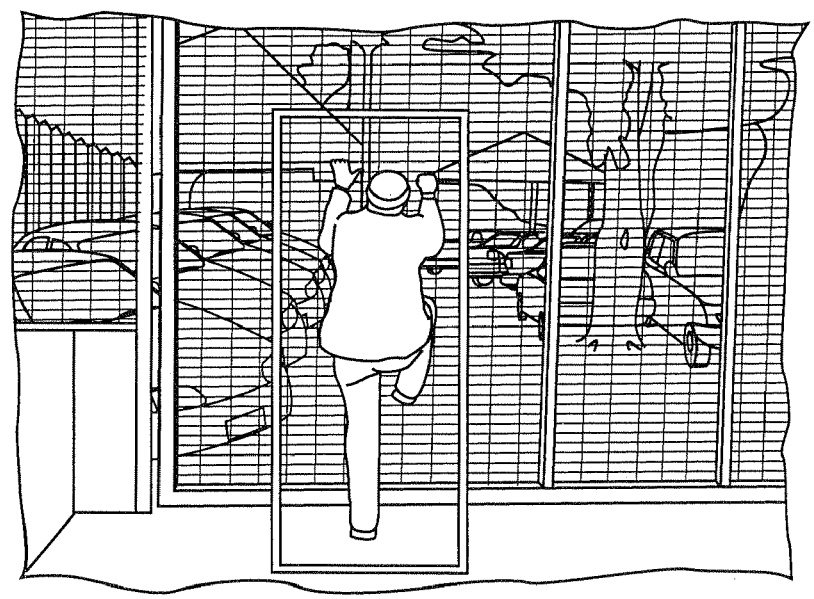
FIG. 7 is a display image of a parking lot intruder, contained within a computer-generated rectangle indicating that a preferred video camera monitoring system is capable of sensing motion within the rectangle.

Another solution is to use far infrared image sensors to detect the presence of pedestrians by measuring heat radiated from the human body. Far infrared sensors readily detect human beings in pitch dark with no external light; however, they are expensive. A preferred solution, in the case of parking lots, is the use of image sensors 30a (one shown in FIG. 6) that are capable of detecting short-range infrared light, such as those developed by NoblePeak Vision Corporation of Wakefield, Mass. Near-infrared image sensors 30a do not need an external light source to function at night because they use available short range infrared light from the atmosphere as a source of ambient light. This makes them ideal for detecting human beings entering or leaving a parking lot, regardless of direction. For example, near infrared image sensors 30a may detect an intruder jumping a fence to avoid entrances, as shown in FIG. 7. While sensors 30a are more expensive, the fact that they require no external lights saves enough money in reduced equipment costs and energy expenditures to recoup within one year the cost of a more expensive imager.

Video Analytics

Simply turning lights on and off as pedestrians enter and leave parking lots gives a visual indication that the area is being monitored and provides an important deterrent. After image sensors 30 confirm the presence of vehicles or pedestrians, video analytics 32 can sense and analyze their motion in greater detail. Security in parking lots, parks, and other public spaces may improve significantly when cameras equipped with video analytics 32 are employed. This is so because video analytics 32 processes video images in real time and thereby enables either an immediate automatic response or quick intervention from central monitoring station 38. When suspicious activity or threatening behavior is recognized by video analytics 32, automated, prerecorded voice annunciation through audio speakers 18 may also be triggered to alert people in the area that parking lot 16 is being monitored for everyone's safety.

One suitable implementation of video analytics 32 is a Model No. VIQ-800HD video analytics product, which is available from VideoiQ, Inc. of Waltham, Mass., the assignee of this patent application, and the operation of which is described in U.S. Patent Application Pub. No. 2005/0002572 A1. The Model No. VIQ-800HD is capable of recognizing vehicles and human beings with a high degree of accuracy, despite minimal processing requirements. Video analytics 32 has even greater advantages when used with mega-pixel imagers, offering better processing efficiencies compared to traditional pixel-differencing approaches. Although this implementation of video analytics 32 is preferred, another video analytics technology may be substituted, provided it has the ability to ignore background lighting changes resulting from lightning, weather, flickering street lights, vehicle headlights, sunlight, reflections, animals, or leaves or papers blowing in the wind and to recognize the direction and speed of travel of pedestrians and vehicles. Video analytics processing of image data acquired by image sensors 30 detects behavior or an event that includes motion or motion of a blob within the field of view of video camera 20 or recognizing a predefined object and tracking its movement.

As a specific example, it is desirable for video analytics 32 to distinguish between approaching and departing vehicles. Therefore the analytics scheme preferably is capable of estimating vehicle speed, distance, and direction of travel. Early detection of approaching vehicles preferably allows enough time to turn on light fixtures 12, even with fast moving traffic. Video analytics 32 offers another advantage in that it automatically calibrates vehicle distances by recognizing typical distances between headlights for most vehicles and by observing traffic patterns. This is important in determining when to turn on light fixtures 12 in response to vehicle distance and speed.

After a vehicle has passed, light fixtures 12 may begin turning off immediately, unless another vehicle is approaching. In the case of streets with two-way traffic, the preferred solution is to use two image sensors 30, one surveying each direction. An alternative solution is to use a mega-pixel CMOS image sensor 30a containing optics in the form of mirrors and lenses to provide an extreme wide-angle view, allowing roads in both directions to be covered by a common sensor. A single sensor using mirrors and lenses may even provide a view of two perpendicular roads converging at a four-way intersection, rather than using four separate sensors.

Response, Network Control Functions, and Self-Diagnostics

Figure 8:
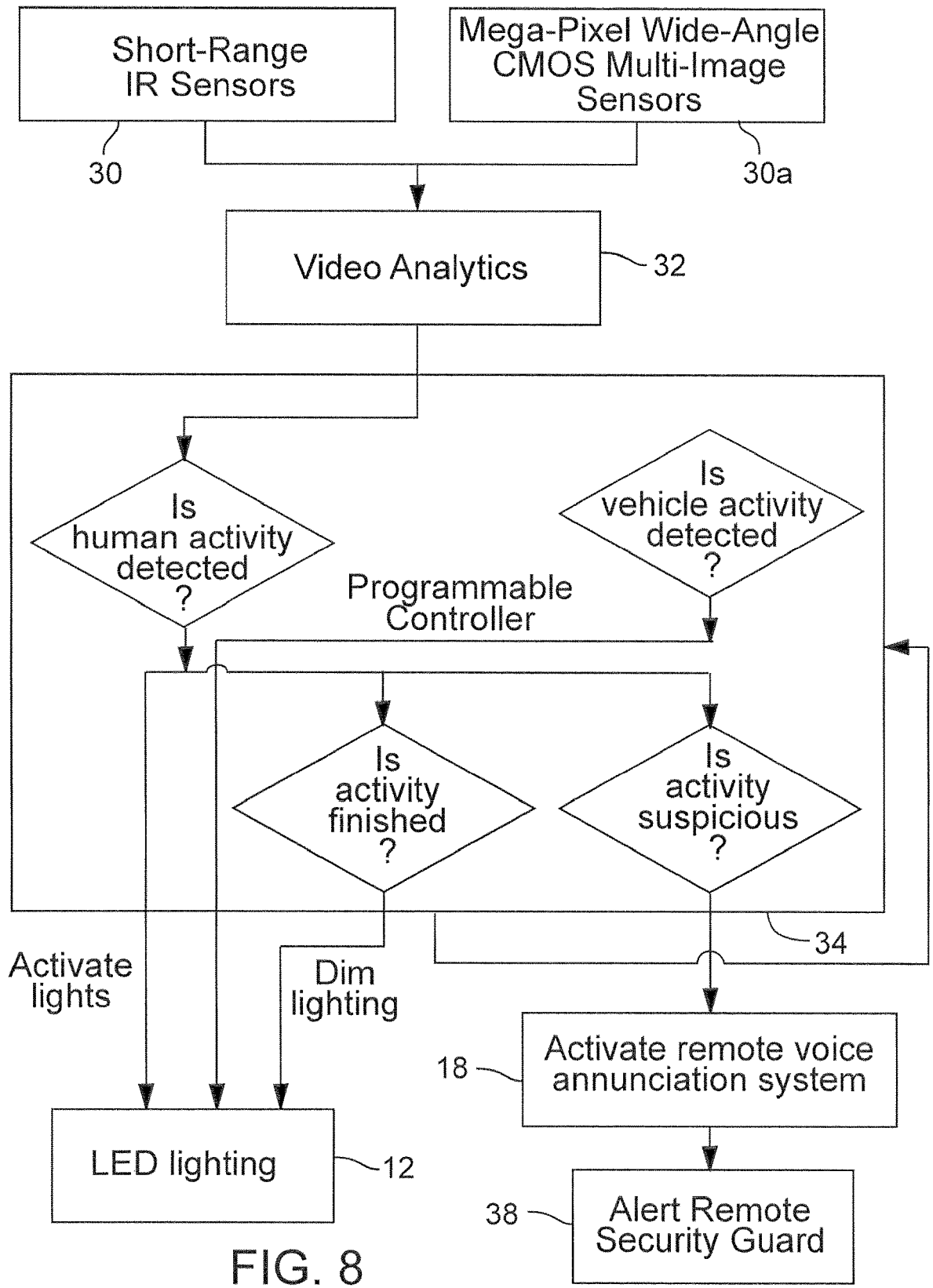
FIG. 8 is a flowchart indicating the flow of information and control among components of a preferred embodiment of the intelligent lighting system of FIG. 1.
Figure 9:
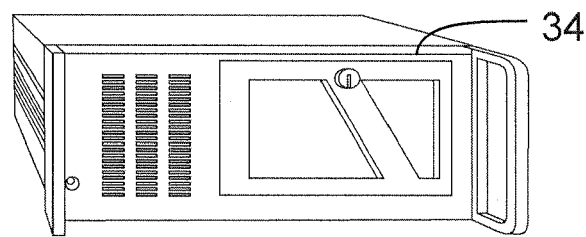
FIG. 9 is a photograph of a preferred embodiment of a network controller that can remotely manage and monitor the integrity of video data transmission.

Lighting, sensor, and video analytics technologies described above, as components of intelligent lighting system 10, cooperate to operate light fixtures 12 according to a decision tree, an example of which is shown in FIG. 8. At the core of the decision structure, programmable controller 34 (shown in FIG. 9) remotely activates or dims lighting according to information provided by video analytics 32, switching street light fixtures 12 on in response to CMOS image sensors 30a when vehicles are detected traversing those streets, and switching them off when there is no traffic present. Similarly, programmable controller 34 switches lights on in parking lots in response to IR image sensors 30a when people are detected leaving nearby buildings or when they enter a lot from an outside road. Light fixtures 12 are then turned off after subjects of interest have left the area.

Figure 10A:
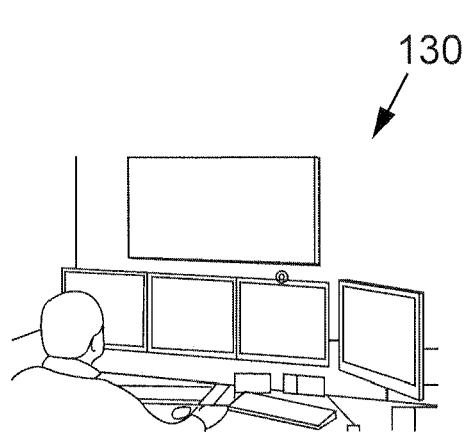
FIG. 10A and FIG. 10B are photographs of a central monitoring station where video data may be screened by security guards for unusual events requiring further attention. Some aspects of this function are automated in the system disclosed, thereby reducing the need for security personnel to engage in passive screening.
Figure 10B:
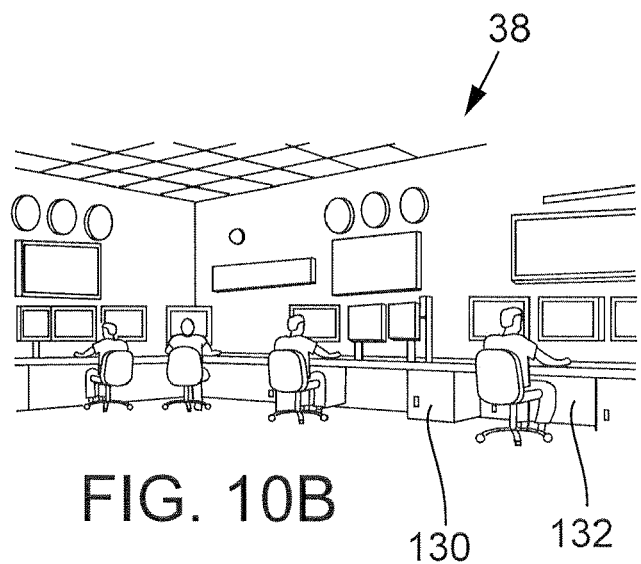

Components of system 10 also cooperate in communicating video and traffic information through communications network 36 to central monitoring station 38, as well as self-diagnostic information useful for maintaining proper operation of overall system 10. A central monitoring station 38, such as the Virtual Sentry intelligent security service available from ViSentry of Paramus, N.J. and shown in FIGS. 10A and 10B, provides continuous intelligent control and review of real time multi-camera and sensor data. Intelligent control enabled by the use of video analytics 32 and programmable controller 34 relieves the client of a traditional, passive surveillance role, in which operators are subject to boredom and fatigue and can only respond to security breaches instead of actively preventing them.

Within just a few seconds, a security guard located at a central monitoring station 38 may view a video clip and determine whether it is worth watching further. Active surveillance technology allows multiple parking lots to be effectively supervised by one guard, making real security protection for outdoor spaces cost effective. Guards on duty need not wait and watch endless streams of real time video until they find something happening, a tedious observational task for which human beings are ill-suited. With video analytics 32, guards may be selectively alerted when something important or suspicious occurs that is worthy of their intervention, that is, when human attention is used to its fullest value. Behaviors or actions that video analytics 32 recognizes as worthy of attention from security personnel include the following examples: individuals loitering in a parking lot, an intruder entering the lot by jumping a fence, one person approaching another person, a thief attempting to break into a car, someone hiding behind cars or behind other objects in the lot, vehicles parked in one place too long, an individual fleeing from a scene, a person waiving his hands wildly and yelling.

Figure 11:
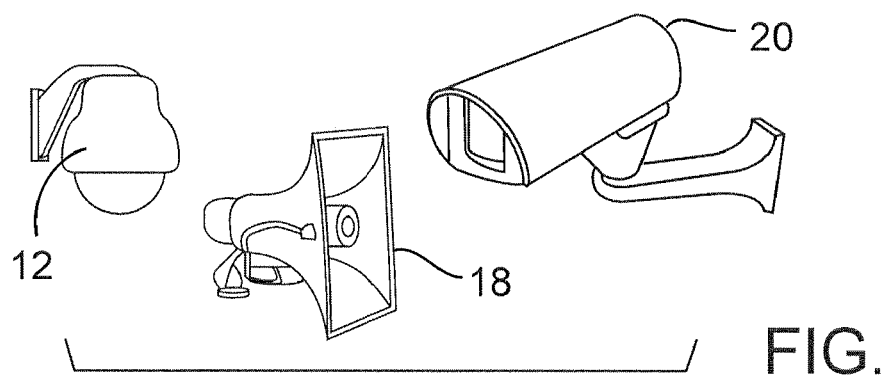
FIG. 11 is a photograph of a set of preferred video and audio equipment intended for installation at remote monitoring locations.

Central monitoring station 38 provides redundancy and a backup database 130 with a secure video/audio archive 132. Operators may respond to alarms by communicating with remote devices such as those shown in FIG. 11, viewing multiple sites on a split screen 134, controlling video cameras 20, sending video snapshots by electronic mail, and creating video clips of an alarm event. Most important, live video and video clips of activity may be streamed to monitoring stations when video analytics 32 detects an event of concern. This technology brings human attention to the scene, coupled with two-way voice communication, alerting a guard to respond to the situation.

In addition to energy savings and enhanced security, video analytics 32 used in an intelligent lighting system 10 may improve traffic control on roads and streets because the system recognizes throughout the day and night, for example, traffic jams, accidents, vehicles traveling the wrong way, and vehicles illegally parked. The same image sensors 30 and video analytics engine 32 used for energy savings and security may provide superior traffic information, by counting vehicles, monitoring speeds of travel, and controlling traffic signals. Because mounted light sources 84 are spaced fairly close together, it is easy to repeat weak signals and transmit information over long distances. Wireless technologies based upon Wi-Max or Wi-Fi and mesh communication topologies may be added inexpensively, expanding network 36 to create a citywide network. This approach is especially appealing if such a network is to be used for other city applications. System 10 may stream video content to traffic personnel located at central monitoring station 38 or through a city traffic network to another remote station to allow immediate observation of a traffic obstruction. A preferred communications approach for traffic control is via electrical power supply lines, using power line communication technologies. This approach incurs the lowest additional cost, while electrical noise associated with street light power lines is typically low, making them ideal forcarrying communications. Light fixtures 12 may also be hard-wired using traditional networking communications, such as Ethernet over copper wire, or over fiber optics.

A preferred embodiment of intelligent lighting system 10 not only communicates sensing data to remote central monitoring stations 38, but system 10 also downloads new algorithms for expanding recognition capability and for programming new detection criteria. For example, it may be desirable to incorporate license plate recognition during an Amber Alert, targeted for a specific license plate number, or rules may be added to recognize approaching police or emergency vehicles to control traffic signals thereby allowing emergency vehicles to pass faster through intersections. A preferred system embodiment may also communicate self-diagnostic information. For instance, if camera 20 has been damaged or fails to detect motion, or if light fixtures 12 fail to switch on or are not illuminating the area properly, the system is able to sense the damage and alert an operator in central monitoring station 38.

A camera 20 combined with video analytics 32 performs these diagnostic roles automatically, saving the need for manual maintenance checks. For instance, the system indicates loss of video data by detecting the absence of the proper video signal voltages. The system can also detect when a camera 20 is out of focus by measuring frequency ratios in the video data, a lack of high frequencies indicating an out-of-focus state. A shift in the image itself indicates the camera 20 has been moved. A motion estimation function can indicate also whether a camera 20 has been moved, if most of the pixels are moving together in the same direction, or whether there is a sudden change in traffic patterns. Another self-diagnostic function recognizes when video data have not changed over an abnormally long time interval such as a full day, or when motion or light intensity levels differ from historical motion patterns. These are indications that the video camera 20 is being masked or otherwise blocked. In general, video analytics 32 can compare video data samples to what is normal or expected at a particular location.

It will be obvious to those having skill in the art that many changes may be made to the details of the above-described embodiments without departing from the underlying principles of the invention. The scope of the present invention should, therefore, be determined only by the following claims.

What is claimed:

1. An illumination system, comprising:
a first light source configured to illuminate a first area of a location;
a first image sensor configured to acquire mega-pixel resolution image data corresponding to the location;
video analytics configured to detect an event in the location using the acquired mega-pixel resolution image data and to provide information about the detected event; and
a controller configured to direct the first light source to assume one extended illumination state among a plurality of extended states of illumination in response to the provided information about the detected event, the plurality of extended states of illumination including a non-illuminated state and a fully illuminated state.

2. The illumination system of claim 1, wherein the video analytics is further configured to detect a blob using the acquired mega-pixel resolution image data, the blob representing a group of pixels within the acquired mega-pixel resolution image data identified as related by the video analytics.

3. The illumination system of claim 2, wherein the video analytics is further configured to determine a distance from the first image sensor to the detected blob using the acquired mega-pixel resolution image data.

4. The illumination system of claim 3, wherein the controller is further configured to direct the first light source to assume the non-illuminated state until the determined distance of the detected blob satisfies a predefined threshold distance.

5. The illumination system of claim 2, wherein the video analytics is further configured to determine a speed of the detected blob using the acquired mega-pixel resolution image data.

6. The illumination system of claim 5, wherein the speed of the detected blob determines a timing of when the controller directs the first light source to assume the one extended illumination state.

7. The illumination system of claim 1, further comprising:
a video camera comprising the first image sensor, the acquired mega-pixel resolution image data corresponding to a field of view of the video camera.

8. The illumination system of claim 7, wherein the video camera includes one or more additional image sensors configured to detect electromagnetic radiation at wavelengths outside of the visible spectrum.

9. The illumination system of claim 7, wherein the video camera includes the video analytics.

10. The illumination system of claim 1, wherein the video analytics is further configured to distinguish between background lighting changes in the first area.

11. A light fixture, comprising:
a first light source configured to illuminate a first area of a location; and
a lighting controller operatively coupled to the first light source and configured to direct the first light source to assume one extended illumination state among a plurality of extended states of illumination using light control signals in response to information received from a video analytics over a communication medium, the plurality of extended states of illumination including a non-illuminated state and a fully illuminated state,
the received information associated with events detected by the video analytics using mega-pixel resolution image data corresponding to the location acquired by one or more image sensors.

12. The light fixture of claim 11, wherein the lighting controller is further configured to direct the first light source to assume the non-illuminated state until the received information indicates the video analytics has detected an event in the location using the acquired mega-pixel resolution image data.

13. The light fixture of claim 11, further comprising:
a second light source to illuminate a second area of the location, the first and second areas being different areas of the location, the light fixture being configured to provide composite illumination patterns, the first area being a near field area of the composite illumination patterns and the second area being a far field area of the composite illumination patterns.

14. The light fixture of claim 13, wherein the composite illumination patterns change over time in response to a direction of travel corresponding to a blob detected by the video analytics using the acquired mega-pixel resolution image data.

15. The light fixture of claim 11, wherein the communication medium is a power line, a wireless communication link, a wired communication link, or a combination thereof.

* * * * *